(12) United States Patent
Vander Lind

(10) Patent No.: US 9,835,139 B2
(45) Date of Patent: Dec. 5, 2017

(54) RADIATOR AND DUCT CONFIGURATION ON AN AIRBORNE WIND TURBINE FOR MAXIMUM EFFECTIVENESS

(71) Applicant: X Development LLC, Mountain View, CA (US)

(72) Inventor: Damon Vander Lind, Alameda, CA (US)

(73) Assignee: X Development LLC, Mountain View, CA (US)

(*) Notice: Subject to any disclaimer, the term of this patent is extended or adjusted under 35 U.S.C. 154(b) by 568 days.

(21) Appl. No.: 14/202,971

(22) Filed: Mar. 10, 2014

(65) Prior Publication Data

US 2015/0252788 A1 Sep. 10, 2015

(51) Int. Cl.
*F03D 11/00* (2006.01)
*F03D 80/00* (2016.01)
*F03D 80/60* (2016.01)

(52) U.S. Cl.
CPC ............. *F03D 11/00* (2013.01); *F03D 80/00* (2016.05); *F03D 80/60* (2016.05); *F05B 2240/921* (2013.01); *F05B 2260/221* (2013.01); *Y02E 10/72* (2013.01); *Y02E 10/722* (2013.01); *Y02T 50/675* (2013.01)

(58) Field of Classification Search
CPC ..... F03D 11/00; F03D 80/00; F05B 2240/921
USPC ........................................................ 416/95
See application file for complete search history.

(56) References Cited

U.S. PATENT DOCUMENTS

| | | | |
|---|---|---|---|
| 2,928,627 A | 7/1956 | Johnson | |
| 4,976,396 A | 12/1990 | Carlson et al. | |
| 7,168,251 B1 | 1/2007 | Janssen | |
| 8,632,032 B2 | 1/2014 | Butler et al. | |
| 8,920,120 B2 * | 12/2014 | Munk-Hansen | ........ F03D 1/001 416/95 |
| 2012/0148407 A1 | 6/2012 | Akashi et al. | |
| 2012/0308383 A1 | 12/2012 | Sabhapathy | |
| 2015/0010402 A1 * | 1/2015 | Rohden | ................ H02K 7/1838 416/95 |

FOREIGN PATENT DOCUMENTS

| | | |
|---|---|---|
| WO | 2013079100 | 6/2013 |
| WO | 2014023835 | 2/2014 |

* cited by examiner

*Primary Examiner* — Kevin Lee
(74) *Attorney, Agent, or Firm* — McDonnell Boehnen Hulbert & Berghoff LLP

(57) ABSTRACT

In order to maximize cooling while minimizing drag in aerial vehicles of airborne wind turbines, it may be preferable to dissipate the cooling energy of the motors via a radiator in a region with advantageous airflow parameters. Aerial vehicle rotors operating in thrust mode may produce relatively more airflow velocity in certain regions further away from the center of the rotor blades, both radially and longitudinally. Placing a radiator in a rotor-supporting pylon and offset from the center of the rotor blades and aft of the rotor blades may allow for greater cooling while the aerial vehicle while in thrust mode.

20 Claims, 7 Drawing Sheets

Section A-A

RADIATOR AND DUCT CONFIGURATION ON AN AIRBORNE WIND TURBINE FOR MAXIMUM EFFECTIVENESS

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Radiator and radiator duct configurations for airborne wind turbines are described herein. More specifically, example embodiments generally relate to the location and configuration of radiators for motor/generators and radiator ducts in airborne wind turbine wake areas for maximum cooling and minimum drag. Beneficially, embodiments described herein may provide both increased cooling and reduced drag versus conventional radiator and radiator duct configurations in airborne wind turbines.

In one aspect, an example airborne wind turbine aerial vehicle may comprise a main wing, a pylon fixed to the main wing, and a rotor assembly. The rotor assembly may comprise a motor and a plurality of rotor blades. The rotor assembly may be fixed to the pylon and may be configured to operate in at least a thrust mode. When operating in thrust mode, an airflow wake created by the rotor may exhibit, in a longitudinal cross section corresponding to a plane of the pylon, an airflow velocity profile. The profile may comprise increased airflow velocity ("$\Delta v$") that varies as a function of radial distance ("R") from a longitudinal centerline of the rotor assembly. Further, the profile may include a local increased velocity maximum ("$\Delta v_{max}$") at a distance ("$R_{max\_flow}$") from the longitudinal centerline of the rotor assembly. Additionally, a radiator may be coupled to the motor and configured to cool the motor. The radiator may be fixed to the pylon aft of the rotor blades and a portion of the radiator may be located within the plane corresponding to the pylon and at the distance $R_{max\_flow}$ from the longitudinal centerline of the rotor assembly.

In another aspect, an example airborne wind turbine aerial vehicle may comprise a main wing, a pylon fixed to the main wing, and a rotor assembly. The rotor assembly may comprise a generator and a plurality of rotor blades. The rotor assembly may be fixed to the pylon and may be configured to operate in at least a drag mode. When operating in drag mode, an airflow wake created by the rotor may exhibit, in a longitudinal cross section corresponding to a plane of the pylon, an airflow velocity profile. The profile may comprise decreased airflow velocity ("$-\Delta v$") that varies as a function of radial distance ("R") from a longitudinal centerline of the rotor assembly. Further, the profile may include a local decreased velocity maximum ("$-\Delta v_{max}$") at a distance ("$R_{min\_flow}$") from the longitudinal centerline of the rotor assembly. Additionally, a radiator may be coupled to the generator and configured to cool the generator. The radiator may be fixed to the pylon aft of the rotor blades and a portion of the radiator may be located within the plane corresponding to the pylon and at the distance $R_{min\_flow}$ from the longitudinal centerline of the rotor assembly.

In a further aspect, an example airborne wind turbine aerial vehicle may comprise a main wing, a pylon fixed to the main wing, and a rotor assembly. The rotor assembly may comprise a motor and a plurality of rotor blades. The rotor assembly may be fixed to the pylon and may be configured to operate in at least a thrust mode. When operating in thrust mode, an airflow wake created by the rotor may exhibit, in a longitudinal cross section corresponding to a plane of the pylon, an airflow velocity profile. The profile may comprise increased airflow velocity ("$\Delta v$") that varies as a function of radial distance ("R") from a longitudinal centerline of the rotor assembly. Additionally, a radiator may be coupled to the motor and configured to cool the motor. The radiator may be fixed to the pylon aft of the rotor blades and a portion of the radiator may be located within the increased airflow profile.

These as well as other aspects, advantages, and alternatives, will become apparent to those of ordinary skill in the art by reading the following detailed description, with reference where appropriate to the accompanying drawings.

DETAILED DESCRIPTION

Figure 1:
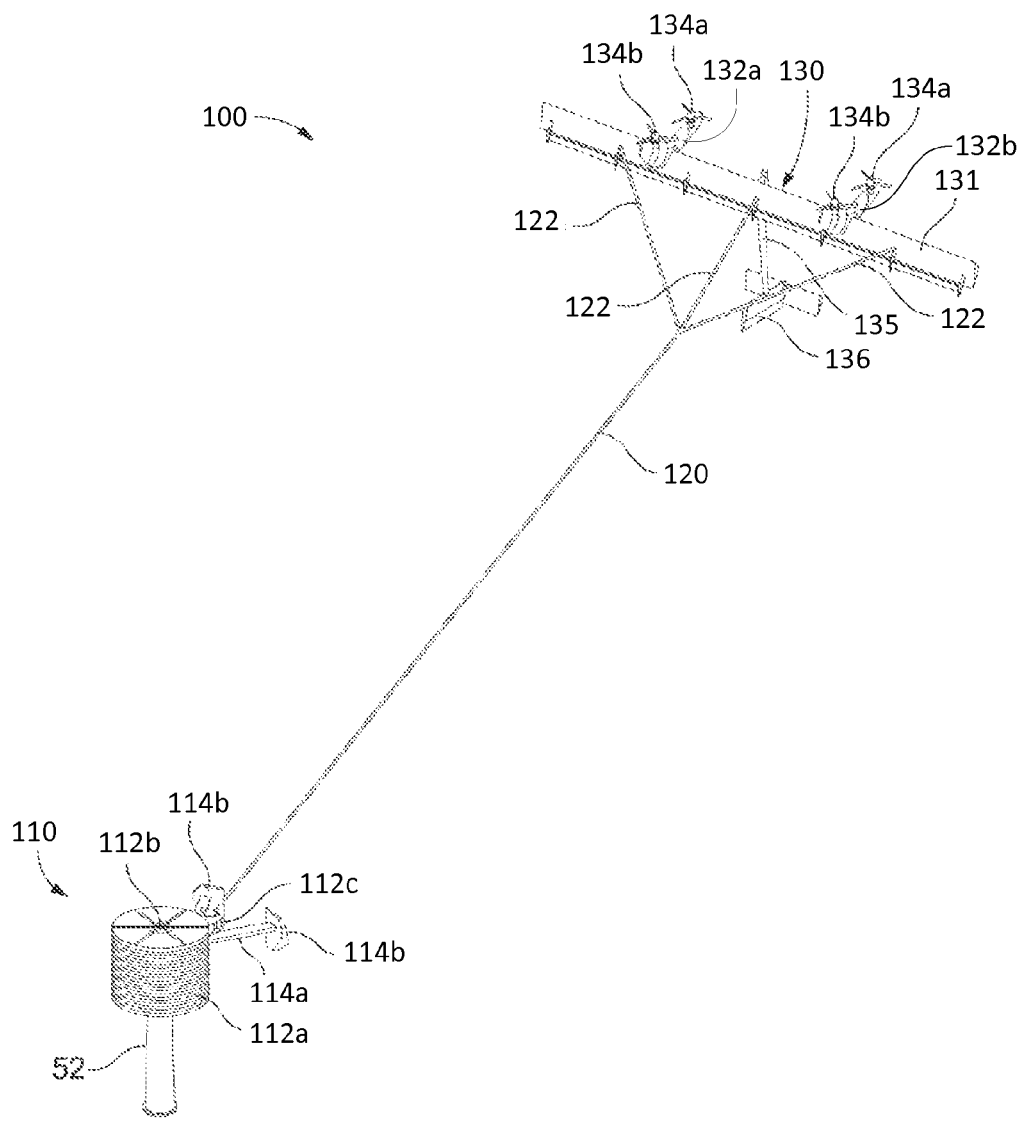
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein. Further, unless otherwise indicated, Figures are not drawn to scale and are used for illustrative purposes only.

I. Overview

Airborne wind turbines may include onboard motors, generators, and/or motor/generator hybrids on their associated aerial vehicles. A motor may be used to provide thrust to an aerial vehicle, and a generator may be used to generate electricity via drag imposed on the aerial vehicle. Preferably, a motor and a generator will be configured in the form of a single motor/generator package that is surrounded by a nacelle and attached to a set of rotor blades which provide the thrust and/or drag. During operation, motor/generators generally generate more waste heat than is practical or efficient for continuous operation and they must reject the excess heat through cooling apparatuses, such as integral heat sinks, integral radiators, or remote radiators. In general, the greater the cooling capacity provided to a motor/generator, the greater the torque capacity that may be utilized for that motor/generator.

Because motor/generators on aerial vehicles are preferably as lightweight and efficient as possible, they are generally small and therefore have a correspondingly small surface area for cooling purposes. This means they must reject heat at a high rate of flux.

In some cases, integral cooling fins or radiators may be located directly on the motor/generator. However, due to aerodynamic effects from the rotor blades, there is generally a low airflow velocity on or near the surface of the motor/generator and any surrounding nacelle and overall cooling capacity is correspondingly low. As a result of the slow airflow, a larger, heavier, and generally more costly fin arrangement and/or radiator must be used in this case. Alternatively, a remote radiator attached to the nacelle may be utilized. However, to accommodate the shape of the nacelle, the radiator and any accompanying ducting must have either complex inlet geometry or complex radiator geometry to minimize inefficient drag. A system which uses a large drag force to cool the motor/generator will not be able to create that drag using the onboard power generating rotor blades.

In order to maximize cooling while minimizing drag, it may be preferable to dissipate the cooling energy of the device away from the source at the motor/generators, and in a region with advantageous airflow parameters. Rotors in thrust mode may produce relatively more airflow velocity in certain regions further away from the center of the rotor blades, both radially and longitudinally. Placing a radiator offset from the center of the rotor blades and behind, or aft of, the rotor blades may allow for greater cooling while an aerial vehicle is in thrust mode, such as during hovering.

In at least the configurations of the aerial vehicles described herein, a radiator can be placed on (including within) a pylon that separates one or more rotor assemblies from a main wing of the aerial vehicle. This allows a radiator to be located in an optimum location both radially and longitudinally in relation to a wake generated by the rotor blades.

Additionally, the pylons described herein may be configured as airfoils and a radiator may be beneficially placed on (including within) the high pressure side of the airfoil. This places the radiator in higher stagnation pressure airflow and that can reduce the drag created by the radiator. Preferably, the radiator may be placed in a radiator duct set into the airfoil, which can further reduce overall drag created by the cooling system. Moreover, the ducted location may allow the use a very simple radiator, which may be flat in planform and without complex aerodynamic surfaces. The radiator may also be set at an angle to the mean airflow direction within the duct. Because there may be a high pressure loss, the radiator may not need to be aligned with the airflow to get roughly uniform inlet velocity. This beneficially allows a wider radiator to fit in the same cross-sectional area as a radiator oriented normal to the flow.

Aerial vehicles described herein may operate not only in thrust mode, but alternatively or additionally in drag mode, during which they generate power during crosswind flight via the rotors and a generator. While the aerial vehicle is in crosswind flight, it may experience a very high mean velocity of airflow. Consequently, the aerial vehicle may see more airflow than is actually required to cool the generator. However, when the aerial vehicle is in drag mode, the rotors may create a velocity deficit of air in the wake of the rotor blades. Because the airflow in generation (drag) mode is much greater than that in hover (thrust) mode, by a larger margin than the increase in required cooling capacity, it is beneficial to place the radiators in a location which sees less freestream velocity in generation mode in order to reduce system drag. By placing a radiator in the location of the largest velocity deficit, their drag may be maximally reduced while still retaining sufficient cooling capacity.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. An aerial vehicle may include or take the form of various types of devices, such as a kite, a helicopter, a wing and/or an airplane, among other possibilities. An aerial vehicle may be formed of solid structures of metal, plastic and/or other polymers. An aerial vehicle may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, the aerial vehicle 130 may be connected to the tether 120 via a bridle portion 122 of the tether 120, and the tether 120 may be connected to the ground station 110. In this example, the tether 120 may be attached to the ground station 110 at one location on the ground station 110, and attached to the aerial vehicle 130 via the bridle at three locations on the aerial vehicle 130. However, in other examples, the tether 120 may be attached via the bridle at one or more locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the aerial vehicle 130 is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight. In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

The ground station 110 may additionally include one or more components, such as winch componentry 112a, 112b, 112c that may be used to vary the deployed length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, one or more components 114a, 114b may be configured to receive the aerial vehicle 130.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

Figure 2:
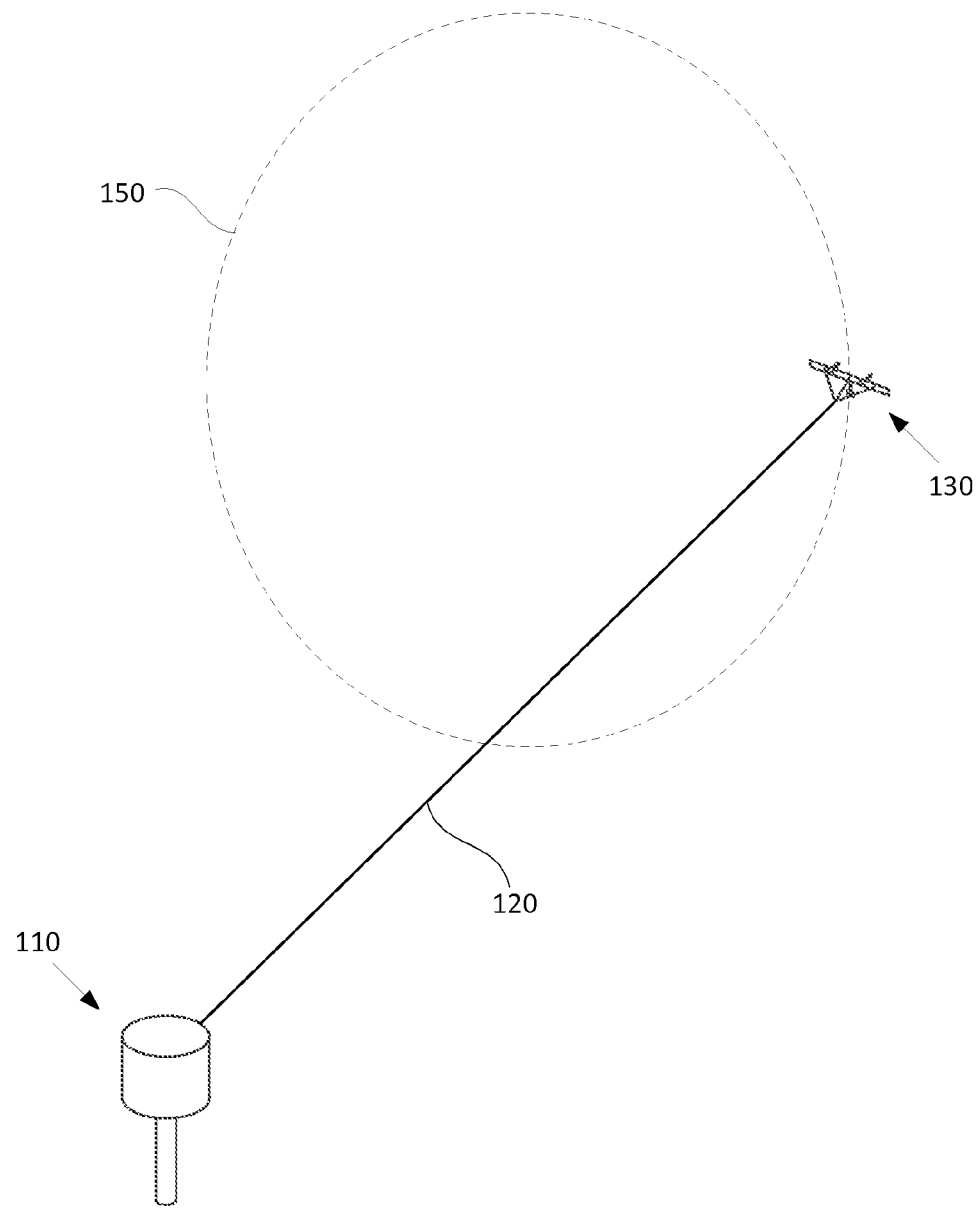
FIG. 2 depicts an example of an aerial vehicle transiting an illustrative flight path.

Referring briefly to FIG. 2, the aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein. The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

Referring again to FIG. 1, the aerial vehicle 130 may include a main wing 131, pylons 132a, 132b, rotors 134a, 134b, a tail boom 135, and a tail wing assembly 136. Any of these components may be shaped in any form which allows for the use of components of lift to resist gravity and/or move the aerial vehicle 130 forward.

The main wing 131 may provide a primary lift force for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 and pylons 132a, 132b may be any suitable material for the aerial vehicle 130 to engage in hover flight, forward flight, and/or crosswind flight. For example, the main wing 131 and pylons 132a, 132b may include carbon fiber and/or e-glass, and include internal supporting spars or other structures. Moreover, the main wing 131 and pylons 132a, 132b may have a variety of dimensions. For example, the main wing 131 may have one or more dimensions that correspond with a conventional wind turbine blade. As another example, the main wing 131 may have a span of 8 meters, an area of 4 meters squared, and an aspect ratio of 15.

The pylons 132a, 132b may connect the rotors 134a, 134b to the main wing 131. In some examples, the pylons 132a, 132b may take the form of, or be similar in form to, a lifting body airfoil (e.g., a wing). In some examples, a vertical spacing between corresponding rotors (e.g., rotor 134a and rotor 134b on pylon 132a) may be 0.9 meters.

The rotors 134a, 134b may be configured to drive one or more generators for the purpose of generating electrical energy. In this example, the rotors 134a, 134b may each include one or more blades, such as three blades or four blades. The rotor blades may rotate via interactions with the wind and be used to drive the one or more generators. In addition, the rotors 134a, 134b may also be configured to provide thrust to the aerial vehicle 130 during flight. With this arrangement, the rotors 134a, 134b may function as one or more propulsion units, such as a propeller. Although the rotors 134a, 134b are depicted as four rotors in this example, in other examples the aerial vehicle 130 may include any number of rotors, such as less than four rotors or more than four rotors.

The tail boom 135 may connect the main wing 131 to the tail wing assembly 136, which may include a tail wing and a vertical stabilizer. The tail boom 135 may have a variety of dimensions. For example, the tail boom 135 may have a length of 2 meters. Moreover, in some implementations, the tail boom 135 could take the form of a body and/or fuselage of the aerial vehicle 130. In such implementations, the tail boom 135 may carry a payload.

The tail wing and/or vertical stabilizer may be used to stabilize the aerial vehicle and/or reduce drag on the aerial vehicle 130 during hover flight, forward flight, and/or crosswind flight. For example, the tail wing and/or vertical stabilizer 136 may be used to maintain a pitch of the aerial vehicle 130 during hover flight, forward flight, and/or crosswind flight. The tail wing assembly 135 may have a variety of dimensions. For example, the tail wing assembly 135 may have a length of 2 meters. Moreover, in some examples, the tail wing assembly 135 may have a surface area of 0.45 meters squared. Further, in some examples, the tail wing assembly 135 may be located 1 meter above a center of mass of the aerial vehicle 130.

While the aerial vehicle 130 has been described above, it should be understood that the methods and systems described herein could involve any suitable aerial vehicle that is connected to an airborne wind turbine tether, such as the tether 120.

B. Transitioning an Aerial Vehicle from Hover Flight to Crosswind Flight

Figure 3:
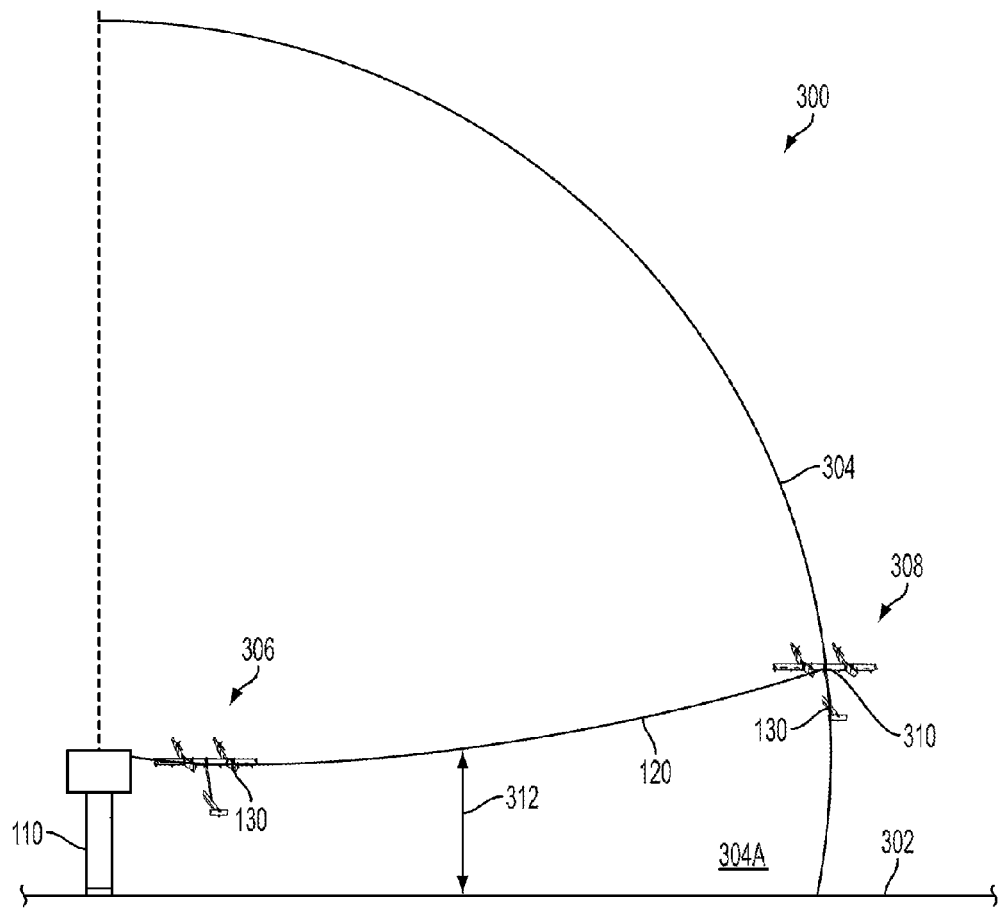
FIG. 3 depicts an example of an aerial vehicle transitioning from hover flight to crosswind flight.

FIG. 3 depicts an example 300 of transitioning an aerial vehicle from hover flight to crosswind flight, such as crosswind flight substantially along path 150, according to an example embodiment. Example 300 is generally described by way of example as being carried out by the aerial vehicle 130 described above in connection with FIG. 1. For illustrative purposes, example 300 is described in a series of actions as shown in FIG. 3, though example 300 could be carried out in any number of actions and/or combination of actions.

As shown in FIG. 3, the aerial vehicle 130 may be connected to the tether 120, and the tether 120 may be connected to the ground station 110. The ground station 110 may be located on ground 302. The tether 120 may define a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation, and one or more rotors may be operating in a thrust mode. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle 130 engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302. The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 while the aerial vehicle 130 is in the hover-flight orientation positioning the aerial vehicle 130 at a first location 310 that is substantially on the tether sphere 304. As shown in FIG. 3a, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. With this arrangement, the tether 120 may be in a catenary configuration. Moreover, a bottom of the tether 120 may be a predetermined altitude 312 above the ground 302. With this arrangement, at point 306 and point 308 the tether 120 may not contact the ground 302.

Example 300 continues with transitioning the aerial vehicle 130 from the forward-flight orientation to a crosswind-flight orientation. In some examples, transitioning the aerial vehicle 130 from the forward-flight orientation to the crosswind-flight orientation may involve a flight maneuver.

When the aerial vehicle 130 is in the crosswind-flight orientation, the aerial vehicle 130 may engage in crosswind flight. For instance, when the aerial vehicle 130 engages in crosswind flight, the aerial vehicle 130 may fly substantially along a path, such as path 150, to generate electrical energy. In some implementations, a natural roll and/or yaw of the aerial vehicle 130 may occur during crosswind flight.

III. Illustrative Radiator Configuration

As used herein, the terms motor, generator, and motor/generator are not meant to be exclusive. For example, the use of the term "motor" does not preclude an airborne wind turbine motor from also functioning as a generator, and a motor/generator does not have to function as both a motor and a generator.

Figure 4:
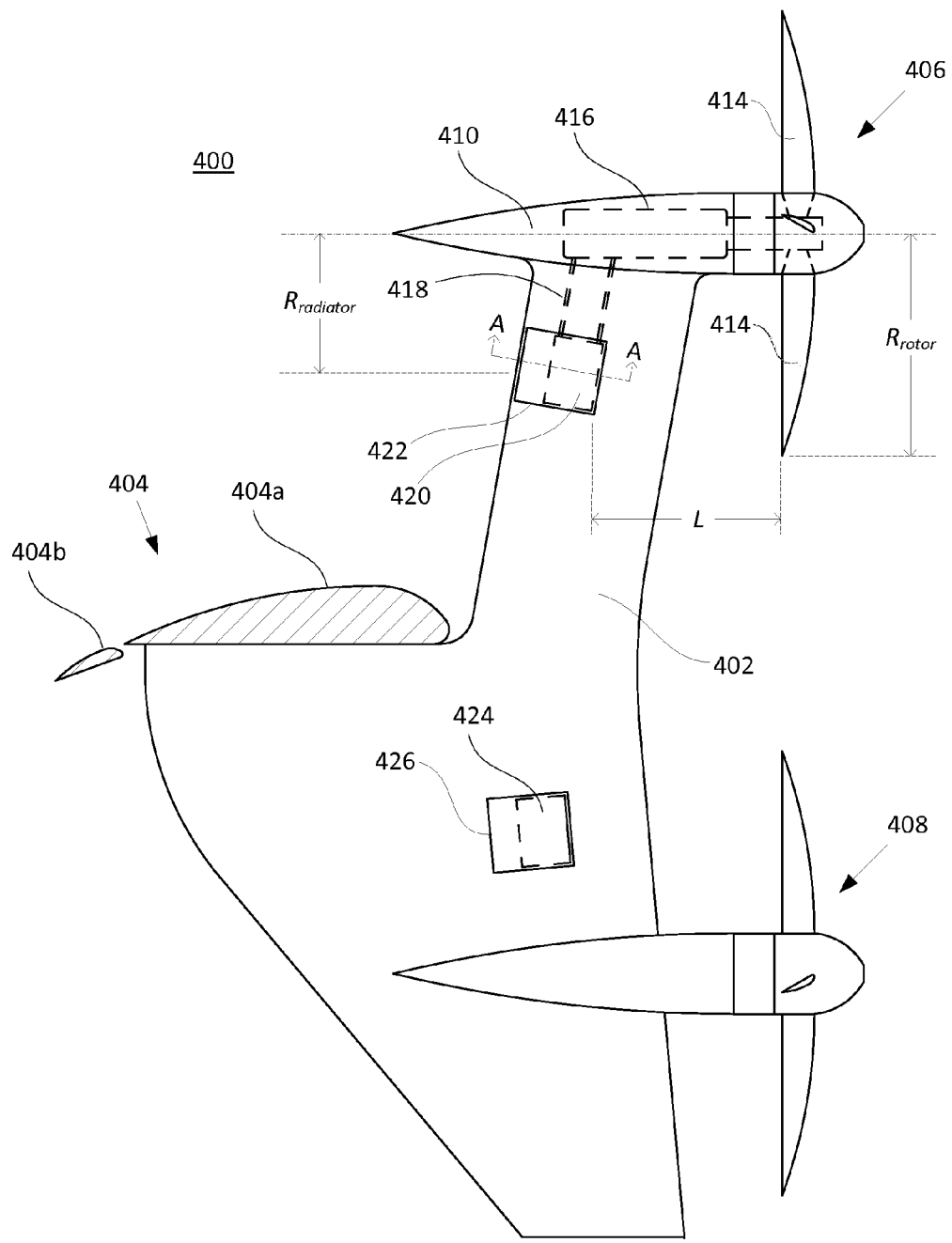
FIG. 4 depicts a cross-section of an aerial vehicle.

FIG. 4 illustrates a cross-section of an aerial wind turbine aerial vehicle 400, such as the aerial vehicle 130 described with respect to FIG. 1. Aerial vehicle 400 is shown in side view at pylon 402, with a cross-section through main wing 404. Main wing 404 may comprise multiple lift-generating airfoil sections, such as main airfoil 404a and trailing airfoil 404b. Pylon 402 may also act as a lift generating airfoil, and may have a cross-sectional shape similar to that of main airfoil 404a, though the generated lift may be oriented orthogonal (or at some other angle) to the generated lift of main wing 404. As illustrated, the high-pressure surface of pylon 402 is the side shown.

Pylon 402 may support multiple rotor assemblies. For example, pylon 402 is shown with upper rotor assembly 406 and lower rotor assembly 408, though more or fewer rotor assemblies are contemplated. Employing rotor assembly 406 as a representative example of other rotor assemblies, rotor assembly 406 may include nacelle 410 and motor/generator 416, which may be connected to a set of rotor blades 414. Motor/generator 416 may be coupled to radiator 420 which may be located in radiator duct 422, either or both of which may be external to pylon 402, but are preferably partially or fully enclosed within pylon 402. Radiator 420 may be coupled to motor/generator 416 via coolant lines 418, such as flexible hoses, semi-rigid tubes, or rigid pipes. (Additionally shown are radiator 424 and radiator duct 426, which may be similarly or identically connected to a motor/generator in rotor assembly 408.)

For reference purposes, dimensions $R_{rotor}$, $R_{radiator}$, and L are illustrated. $R_{rotor}$ represents the radius of rotor assembly 406, as measured from the tip of a rotor blade 414 to the longitudinal centerline of rotor assembly 406 (hereinafter, "rotor centerline"). $R_{radiator}$ represents the distance from the rotor centerline to a representative location on radiator 420. The particular location on radiator 420 illustrated in FIG. 4 for dimension $R_{radiator}$ is intended to be exemplary only and is not intended to be limiting. L represents the distance from the set of rotor blades 414 to a representative location on radiator 420. Likewise, the particular location on radiator 420 illustrated in FIG. 4 for dimension L is intended to be exemplary only and is not intended to be limiting.

Figure 5:
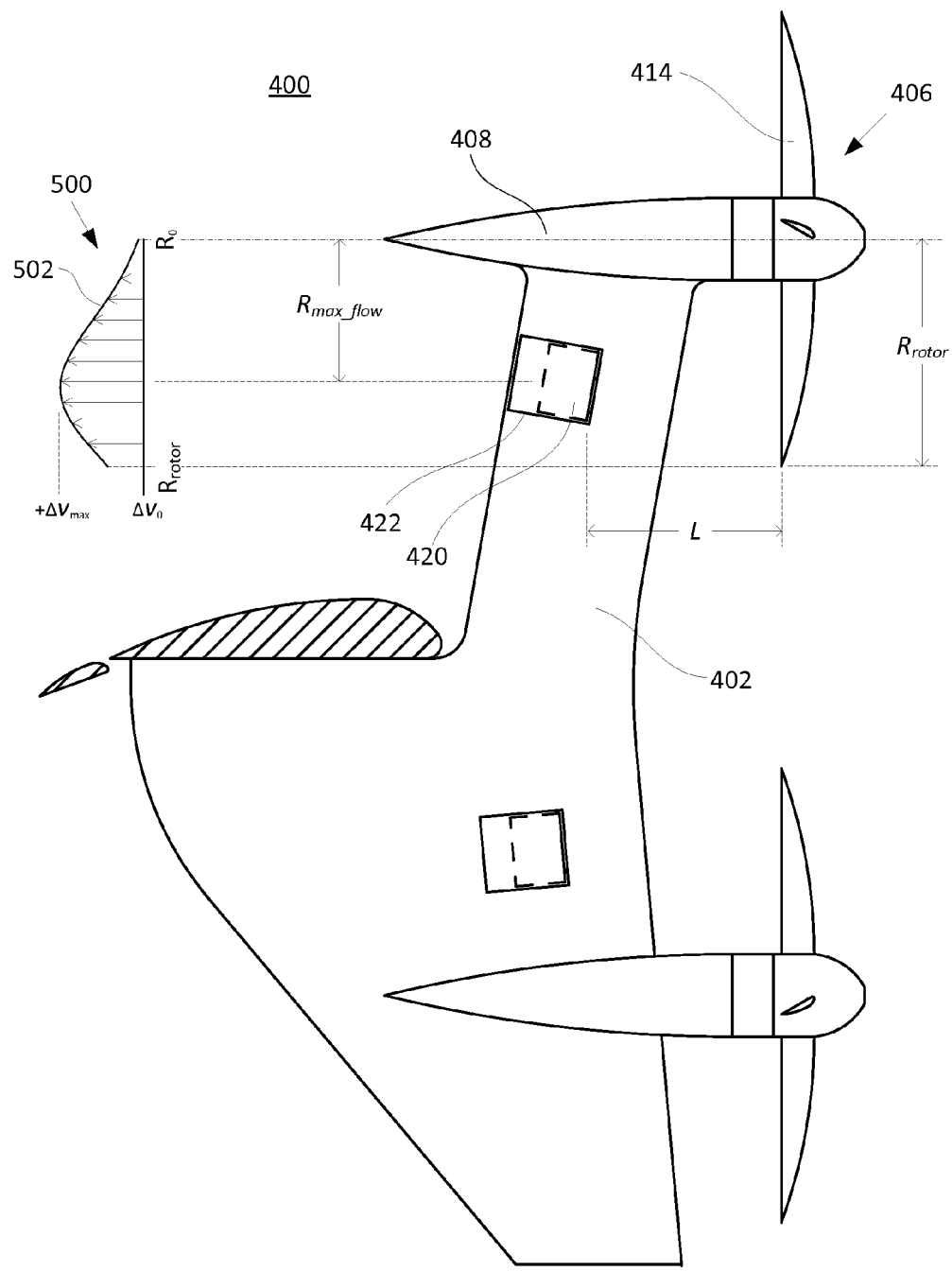
FIG. 5 depicts a cross-section of an aerial vehicle, including a wake profile.

Rotor assembly 406 may be capable of producing thrust, such as when the aerial vehicle is taking off or landing, and/or drag, such as when the aerial vehicle is flying at a large forward velocity in crosswind flight. Referring now to FIG. 5, when rotor assembly 406 is in thrust mode, rotor blades 414 may add velocity to the incoming airflow. This velocity increase may, as a result of induced flow effects around the rotor and other aerodynamic effects, take up to a distance equivalent to the radius of the rotor ($R_{rotor}$) to fully develop and enter the wake aft of the rotor. In a general sense, the airflow in the wake may be radially symmetric.

Chart 500 of FIG. 5 illustrates an exemplary profile 502 of increased airflow velocity as a function of radial distance from the rotor centerline. Profile 502 reflects a cut view of the wake profile along a longitudinal cross section of the wake that may correspond to the near side plane of the pylon 402 (i.e., the visible surface of pylon 402). The vertical axis of chart 500 is the radial distance R from the rotor centerline, and illustrates a range from $R_0$ to $R_{rotor}$. The horizontal axis of chart 500 is the increased airflow velocity $\Delta v$ as compared between the air velocity entering the rotor blades 414 and the air velocity in the fully developed wake aft of the rotor blades 414, and is illustrated as a range from $\Delta v_0$ to $+\Delta v_{max}$.

Profile 502 illustrates that, in thrust mode, increased air velocity for a particular streamline in the wake may vary with respect to the distance of the stream line from the rotor centerline. Profile 502 may further reflect a local maximum in the increased air velocity $+\Delta v_{max}$ at a distance $R_{max\_flow}$ from the rotor centerline. Preferably, to maximally cool the motor/generators in thrust mode, or any other case when static thrust is descriptive of the air flow, some or all of radiator 420 may be located inline with a location of maximum airflow velocity increase. Stated another way, a portion of radiator 420 may be located within a plane corresponding to pylon 402 and at the distance $R_{max\_flow}$ from the longitudinal centerline of rotor assembly 408. Alternatively, radiator 420 may be not be located inline with a location of maximum airflow velocity increase, but rather at least a portion of radiator 420 may be located elsewhere within the increased air velocity profile 502 so that radiator 420 still experiences an increased air velocity relative to other locations on the aerial vehicle 400. As such, a portion of the radiator may be located within the increased airflow profile and at a distance $R_{radiator}$ from a longitudinal centerline of the rotor assembly. For an aerial vehicle of the type described and illustrated with respect to aerial vehicles 130 and 400, the wake may generally exhibit a peak increased air velocity at a radial distance R of between 50% and 80% of $R_{rotor}$. Preferably, radiator 420 may be located on pylon 402 and within this radial distance range of the rotor centerline. Additionally, to ensure that the maximum velocity flow has fully developed, radiator 420, or at least a portion thereof, may be placed at least one rotor radius aft of the rotor blades 420 (e.g., $L \geq R_{rotor}$).

Figure 6:
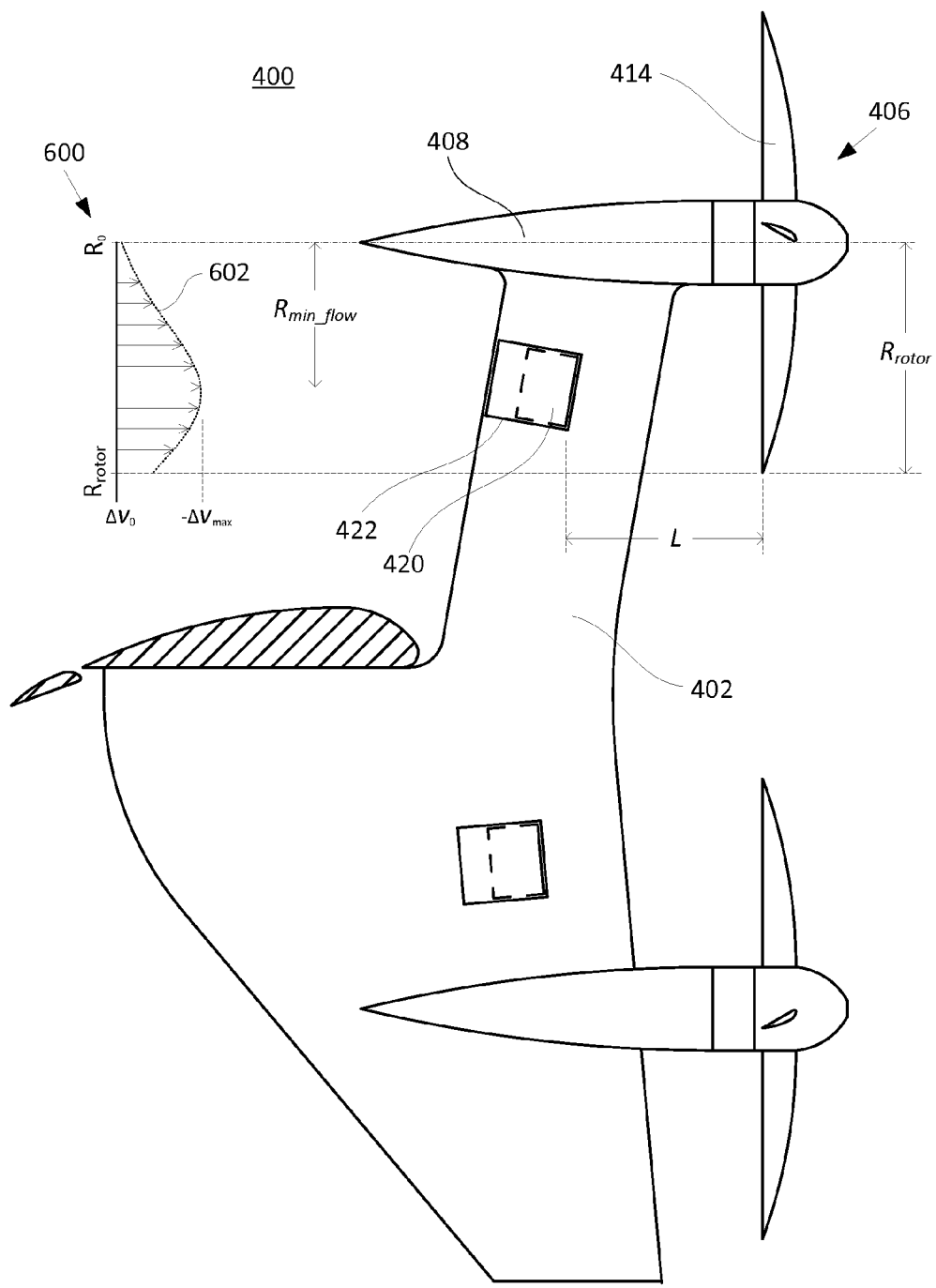
FIG. 6 depicts a cross-section of an aerial vehicle, including a wake profile.

Referring now to FIG. 6, after an aerial vehicle transitions from hover mode to crosswind flight, relative airspeed may be very large and there may be a very high mean air flow velocity across the pylon. Consequently, a radiator may see more than the required level of airflow necessary for cooling the motor/generator in undisturbed air. Beneficially, when in crosswind flight, the motor/generators may be in electrical generation mode, and therefore the rotor assemblies may be operating in drag mode. When in drag mode, the rotor assemblies may create a velocity deficit of air in the wake of the rotor blades.

Similarly to FIG. 5, chart 600 of FIG. 6 illustrates an exemplary profile 602 of decreased airflow velocity (i.e., velocity deficit) as a function of radial distance from the rotor centerline. Profile 602 reflects a cut view of the wake profile along a longitudinal cross section of the wake that may corresponds to the near side plane of pylon 402. The vertical axis of chart 600 is the radial distance R from the rotor centerline, and illustrates a range from $R_0$ to $R_{rotor}$. The horizontal axis of chart 600 is the decreased airflow velocity $-\Delta v$ as compared between the air velocity entering the rotor blades 414 and the air velocity in the fully developed wake aft of the rotor blades 414, and is illustrated as a range from $\Delta v_0$ to $-\Delta v_{max}$.

Profile 602 illustrates that, in drag mode, decreased air velocity for a particular streamline in the wake may vary with respect to the distance of the stream line from the rotor centerline. Profile 602 may reflect a local maximum in the magnitude of the decreased air velocity $-\Delta v_{max}$ at a distance $R_{min\_flow}$ from the rotor centerline. Preferably, to reduce system drag from the radiator 420 in drag mode, radiator 420 may be located inline with a location of maximum airflow velocity decrease. Stated another way, a portion of radiator 420 may be located within a plane corresponding to pylon 402 and at the distance $R_{min\_flow}$ from the longitudinal centerline of rotor assembly 408. In preferred designs of aerial vehicle 400 and its various components, $R_{max\_flow}$ and $R_{min\_flow}$ may be substantially equivalent.

Alternatively, radiator 420 may be not be located inline with a location of maximum airflow velocity deficit, but rather at least a portion of radiator 420 may be located elsewhere within the decreased air velocity profile so that radiator 420 still experiences a decreased air velocity relative to other locations on the aerial vehicle 400. As such, a portion of the radiator may be located within the decreased airflow profile 602 and at a distance $R_{radiator}$ from a longitudinal centerline of the rotor assembly. For an aerial vehicle of the type described and illustrated with respect to aerial vehicles 130 and 400, the wake may generally exhibit a peak air velocity deficit at a radial distance R of between 50% and 80% of $R_{rotor}$. Preferably, radiator 420 may be located on pylon 402 and within this radial distance range of the rotor centerline. Additionally, to ensure that the maximum velocity deficit has fully developed, radiator 420, or at least a portion thereof, may be placed at least one rotor radius aft of the rotor blades 420 (e.g., $L \geq R_{rotor}$). By placing radiator 420, or a portion thereof, in the location of the largest velocity deficit, its drag may be significantly reduced as compared to other locations, while still retaining sufficient cooling capacity due to the overall high mean airflow velocity over the pylon 402.

IV. Illustrative Duct Configuration

Figure 7:
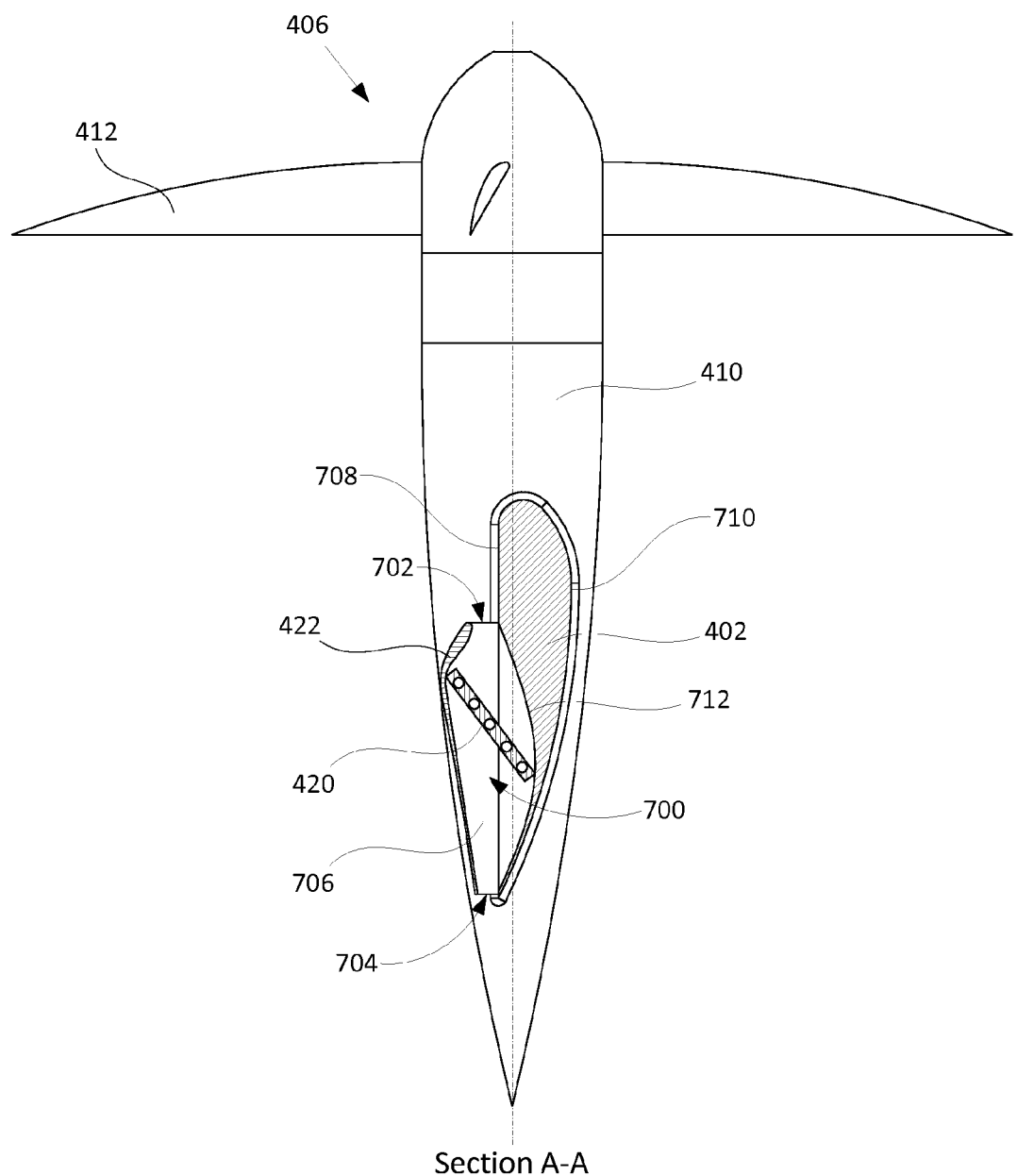
FIG. 7 depicts a cross-section of an aerial vehicle pylon and radiator duct.

The disclosed radiator locations beneficially may allow the use of a very simple radiator which may be flat in planform. If radiators (and any accompanying radiator ducts) were instead placed on a rotor assemble nacelle, they must have either complex inlet geometry or complex radiator geometry in order to account for the shape of the nacelle. FIG. 7 illustrates a cross-section view A-A of FIG. 4 and shows an exemplary radiator 420 and radiator duct 700. Radiator 420 may reside in radiator duct 700. Duct 700 may include an internal duct surface 712 of pylon 402, an external duct cover 422, a duct side panel 706, and another duct side panel (not illustrated in cross-section view A-A), an air inlet 702, and an air outlet 704, all of which may serve to form an internal air passage. Duct 700 may be located on the high pressure surface 708 of pylon 402, so the opposing low pressure lifting surface 710 (i.e., suction surface) of pylon 402 remains undisturbed, and also so inlet 702 is in lower speed but higher stagnation pressure air. This may reduce the drag created by radiator 420 and duct 700. Radiator 420 may be set within duct 700 at an angle to the mean airflow direction. Because radiator 420 may have a high pressure loss, it need not be aligned with the flow to get roughly uniform inlet velocity. This beneficially allows a wider radiator to be fit in a smaller duct cross-section size.

V. Conclusion

The particular arrangements shown in the Figures should not be viewed as limiting. For example, relative sizes of components, dimensions, and specifically illustrated locations are intended to be exemplary only and are not intended to be limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I claim:

1. An airborne wind turbine aerial vehicle comprising,
a main wing;
a pylon fixed to the main wing;
a rotor assembly comprising a motor and a plurality of rotor blades, wherein the rotor assembly is fixed to the pylon, and wherein the rotor assembly is configured to operate in at least a thrust mode, and wherein an airflow wake created by the rotor blades while operating in thrust mode exhibits, in a longitudinal cross section corresponding to a plane of the pylon, an airflow velocity profile comprising increased airflow velocity ("$\Delta v$") that varies as a function of radial distance ("R") from a longitudinal centerline of the rotor assembly, and wherein the profile includes a local increased velocity maximum ("$\Delta v_{max}$") at a distance ("$R_{max\_flow}$") from the longitudinal centerline of the rotor assembly, and wherein the rotor blades have a maximum length ("$R_{rotor}$") measured from the longitudinal centerline of the rotor assembly;
a radiator coupled to the motor and configured to cool the motor, wherein the radiator is fixed to the pylon aft of the rotor blades, and wherein a portion of the radiator is located within the plane corresponding to the pylon and at the distance ("$R_{max\_flow}$") from the longitudinal centerline of the rotor assembly.

2. The aerial vehicle of claim 1, wherein the value of $R_{max\_flow}$ is between 50 percent and 80 percent of the value of $R_{rotor}$.

3. The aerial vehicle of claim 1, wherein a portion of the radiator is located at a distance ("L") aft of the rotor blades, and wherein L≥$R_{rotor}$.

4. The aerial vehicle of claim 1, wherein the pylon is configured as a lift-generating airfoil comprising a high pressure surface and an opposing low-pressure surface.

5. The aerial vehicle of claim 4, wherein the radiator is subject to airflow along the high pressure surface of the pylon.

6. The aerial vehicle of claim 1, further comprising a radiator duct, the radiator duct comprising (i) an internal duct surface located at least partially internal to the pylon; (ii) an external duct cover opposite the internal duct surface; (iii) an air inlet; (iv) an air outlet; and (v) an air passage defined, at least in part, by the internal duct surface and the external duct cover, wherein the radiator is located within the air passage, and wherein the air passage is configured to direct airflow from the wake through the radiator.

7. The aerial vehicle of claim 6, wherein the pylon is configured as a lift-generating airfoil comprising a high pressure surface and an opposing low-pressure surface, and wherein the internal duct surface interrupts the high pressure surface.

8. An airborne wind turbine aerial vehicle comprising,
a main wing;
a pylon fixed to the wing;
a rotor assembly fixed to the pylon and comprising a generator and a plurality of rotor blades, wherein the rotor assembly is configured to operate in at least a drag mode, and wherein an airflow wake created by the rotor blades while operating in drag mode exhibits, in a longitudinal cross section corresponding to a plane of the pylon, an airflow velocity profile comprising decreased airflow velocity ("$-\Delta v$") that varies as a function of radial distance ("R") from a longitudinal centerline of the rotor assembly, and wherein the profile includes a local decreased airflow velocity maximum ("$-\Delta v_{max}$") at a distance ("$R_{min\_flow}$") from the longitudinal centerline of the rotor assembly, and wherein the rotor blades have a maximum length ("$R_{rotor}$") measured from the longitudinal centerline of the rotor assembly;
a radiator coupled to the generator and configured to cool the generator, wherein the radiator is fixed to the pylon aft of the rotor blades, and wherein a portion of the radiator is located within the plane corresponding to the pylon and at the distance ("$R_{max\_flow}$") from the longitudinal centerline of the rotor assembly.

9. The aerial vehicle of claim 8, wherein the value of $R_{min\_flow}$ is between 50 percent and 80 percent of the value of $R_{rotor}$.

10. The aerial vehicle of claim 8, wherein a portion of the radiator is located at a distance ("L") aft of the rotor blades, and wherein L≥$R_{rotor}$.

11. The aerial vehicle of claim 8, wherein the pylon is configured as a lift-generating airfoil comprising a high pressure surface and an opposing low-pressure surface.

12. The aerial vehicle of claim 11, wherein the radiator is subject to airflow along the high pressure surface of the pylon.

13. The aerial vehicle of claim 8, further comprising a radiator duct, the radiator duct comprising (i) an internal duct surface located at least partially internal to the pylon; (ii) an external duct cover opposite the internal duct surface; (iii) an air inlet; (iv) an air outlet; and (v) an air passage defined, at least in part, by the internal duct surface and the external duct cover, wherein the radiator is located within the air passage, and wherein the air passage is configured to direct airflow from the wake through the radiator.

14. The aerial vehicle of claim 13, wherein the pylon is configured as a lift-generating airfoil comprising a high pressure surface and an opposing low-pressure surface, and wherein the internal duct surface interrupts the high pressure surface.

15. An airborne wind turbine aerial vehicle comprising,
a main wing;
a pylon fixed to the main wing;
a rotor assembly fixed to the pylon and comprising a motor and a plurality of rotor blades, wherein the rotor assembly is configured to operate in at least a thrust mode, and wherein an airflow wake created by the rotor blades while operating in thrust mode exhibits, in a longitudinal cross section corresponding to a plane of the pylon, an airflow velocity profile comprising an increased airflow velocity ("$\Delta v$") that varies as a function of radial distance ("R") from a longitudinal centerline of the rotor assembly, and wherein the rotor blades have a maximum length ("$R_{rotor}$") measured from the longitudinal centerline of the rotor assembly;
a radiator coupled to the motor and configured to cool the motor, wherein the radiator is fixed to the pylon aft of the rotor blades, and wherein a portion of the radiator is located within the increased airflow profile and at a distance ("$R_{radiator}$") from a longitudinal centerline of the rotor assembly.

16. The aerial vehicle of claim 15, wherein the value of $R_{radiator}$ is between 50 percent and 80 percent of the value of $R_{rotor}$.

17. The aerial vehicle of claim 15, wherein a portion of the radiator is located at a distance ("L") aft of the rotor blades, and wherein $L \geq R_{rotor}$.

18. The aerial vehicle of claim 15, wherein the pylon is configured as a lift-generating airfoil comprising a high pressure surface and an opposing low-pressure surface.

19. The aerial vehicle of claim 18, wherein the radiator is subject to airflow along the high pressure surface of the pylon.

20. The aerial vehicle of claim 15, further comprising a radiator duct, the radiator duct comprising (i) an internal duct surface located at least partially internal to the pylon; (ii) an external duct cover opposite the internal duct surface; (iii) an air inlet; (iv) an air outlet; and (v) an air passage defined, at least in part, by the internal duct surface and the external duct cover, wherein the radiator is located within the air passage, and wherein the air passage is configured to direct airflow from the wake through the radiator.

* * * * *